(12) United States Patent
Singer et al.

(10) Patent No.: US 6,386,654 B1
(45) Date of Patent: *May 14, 2002

(54) PROTECTIVE COVER FOR GUIDE BLOCKS

(75) Inventors: Stephen M. Singer, Brimfield; Robert J. Grob, Peoria; Sean C. McGinnis, DeKalb; Kristine R. Steiner, Tremont, all of IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,357

(22) Filed: Dec. 8, 1998

(51) Int. Cl.[7] ............................................. F16H 55/48
(52) U.S. Cl. ...................................... 305/194; 301/195
(58) Field of Search ................................ 305/160, 173, 305/175, 178, 179, 193, 194, 195, 191, 192, 197, 167, 168, 169

(56) References Cited

U.S. PATENT DOCUMENTS

| | | | | |
|---|---|---|---|---|
| 1,790,098 A | * | 1/1931 | Kegresse ..................... | 305/180 |
| 2,338,550 A | * | 1/1944 | Sloman et al. ............... | 305/175 |
| 2,984,120 A | * | 5/1961 | Hurry ......................... | 305/179 |
| 3,118,709 A | * | 1/1964 | Case ........................... | 305/178 |
| 3,250,577 A | * | 5/1966 | Olson ......................... | 305/179 |
| 3,711,165 A | * | 1/1973 | Russ, Sr. ..................... | 305/178 |
| 3,747,995 A | * | 7/1973 | Russ, Sr. ..................... | 305/179 |
| 3,756,668 A | * | 9/1973 | Russ, Sr. ..................... | 305/178 |
| 3,858,948 A | * | 1/1975 | Johnson et al. .............. | 305/178 |
| 3,858,949 A | * | 1/1975 | Russ, Sr. et al. ............. | 305/178 |
| 3,883,191 A | * | 5/1975 | Chaumont ................... | 305/179 |
| 3,888,132 A | * | 6/1975 | Russ, Sr. ..................... | 305/178 |
| 3,948,110 A | * | 4/1976 | Lassanske ................... | 305/178 |
| 4,217,006 A | * | 8/1980 | Dehnert ...................... | 305/179 |
| 4,469,379 A | * | 9/1984 | Kotyuk, Jr. .................. | 305/195 |
| 4,502,736 A | | 3/1985 | Johnson ....................... | 305/9 |
| 4,616,883 A | | 10/1986 | Edwards et al. .............. | 305/40 |
| 4,844,560 A | | 7/1989 | Edwards et al. .......... | 305/35 R |
| 4,904,030 A | | 2/1990 | Ono ....................... | 305/35 EB |
| RE33,324 E | | 9/1990 | Edwards et al. .......... | 305/35 R |
| 5,005,921 A | | 4/1991 | Edwards et al. ........ | 305/35 EB |
| 5,020,865 A | | 6/1991 | Edwards et al. ........ | 305/35 EB |
| 5,040,282 A | | 8/1991 | Edwards et al. .............. | 29/436 |
| 5,104,205 A | | 4/1992 | Motomura et al. ........... | 305/12 |
| 5,368,376 A | | 11/1994 | Edwards et al. ........ | 305/35 EB |
| 5,433,515 A | | 7/1995 | Purcell et al. ................. | 305/25 |
| 5,482,364 A | | 1/1996 | Edwards et al. .............. | 305/39 |
| 5,511,869 A | | 4/1996 | Edwards et al. .......... | 305/35 R |
| 5,540,489 A | * | 7/1996 | Muramatsu et al. ......... | 305/195 |
| 5,632,538 A | * | 5/1997 | Wiesner et al. .............. | 305/194 |
| 5,707,123 A | * | 1/1998 | Grob ........................... | 305/195 |
| 5,758,932 A | * | 6/1998 | Klopfenstein et al. ....... | 305/195 |
| 5,908,226 A | * | 6/1999 | Courtemanche ............. | 305/179 |
| 5,984,438 A | * | 11/1999 | Tsunoda et al. .............. | 305/179 |
| 6,000,766 A | * | 12/1999 | Takeuchi et al. ............. | 305/178 |

FOREIGN PATENT DOCUMENTS

| | | | | |
|---|---|---|---|---|
| JP | 361075070 | * | 4/1986 | .................. 305/173 |
| JP | 361113571 | * | 5/1986 | .................. 305/173 |
| JP | 402227385 | * | 9/1990 | .................. 305/160 |
| JP | 406072362 | * | 3/1994 | .................. 305/173 |
| JP | 406144310 | * | 5/1994 | .................. 305/173 |
| JP | 406234378 | * | 8/1994 | .................. 305/173 |

* cited by examiner

Primary Examiner—S. Joseph Morano
Assistant Examiner—Long Buo Nguyen
(74) Attorney, Agent, or Firm—Haverstock, Garrett & Roberts; Jenkens & Gilchrist

(57) ABSTRACT

A protective cover member for a guide block on a drive belt includes an inner portion shaped to substantially conform to at least a portion of the outer surface of the guide block. The cover member is attached to the guide block by bonding the cover member to the guide block, mechanical fasteners such as screws or bolts, and/or using an interference design whereby the cover member is retained by frictional forces or by snapping around a portion of the guide block. The outer surface of the cover member is shaped and sized to be engaged by drive members associated with a drive wheel. The cover member may be constructed of material that is capable of withstanding higher temperatures and forces compared to the material of the guide blocks.

6 Claims, 5 Drawing Sheets

PRIOR ART

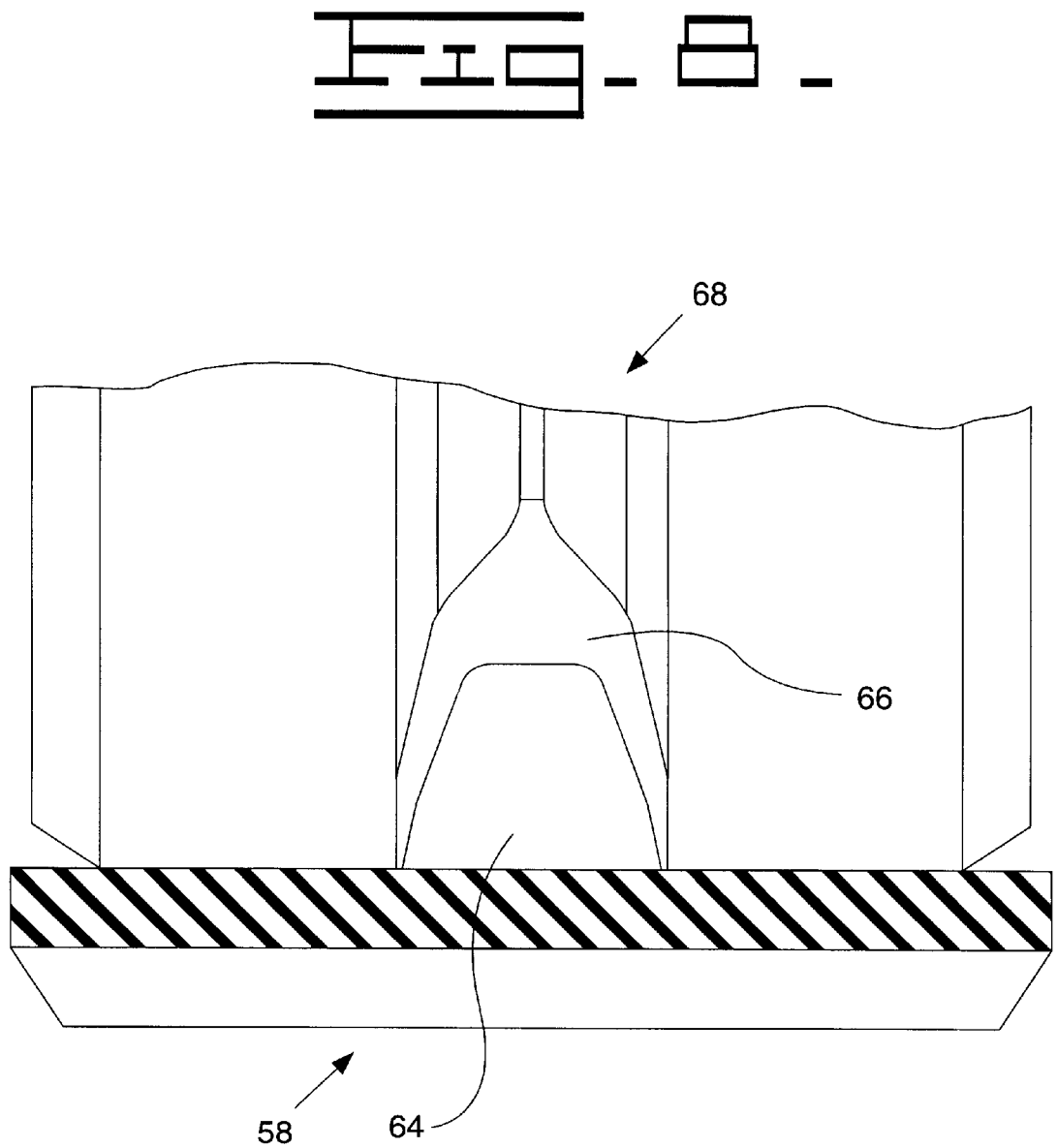
Fig_8_

PROTECTIVE COVER FOR GUIDE BLOCKS

TECHNICAL FIELD

The present invention relates generally to drive belts for track-type machinery and, more particularly, to a protective cover for guide blocks on a drive belt.

BACKGROUND

Agricultural and construction machines often operate in soils such as mud and sand where it is difficult for conventional wheel type machines to gain traction. Therefore, alternate types of machines capable of operating in such adverse soil conditions are in demand.

One type of such machine is one having an undercarriage incorporating a track assembly as shown in FIG. 1 including a driving sprocket wheel 10, an idler wheel 12, a drive belt 14 which extends around the driving sprocket wheel 10 and the idler wheel 12, and a plurality of roller wheels 16 arranged in contact with the inner surface 18 of a ground contact region of the drive belt 14 between the driving sprocket wheel 10 and the idler wheel 12. A conventional drive belt 14 has a plurality of rubber lugs 20 formed on its outer circumference 22, and a plurality of protruding guide blocks 24 formed on the inner surface 18 to protrude at a central region thereof and spaced to each other by a predetermined distance in the longitudinal direction of the drive belt 14. The guide blocks 24 are engaged by a plurality of driving members 26 such as drive pins, teeth, or the like disposed between the wheel portions and adapted to drive the drive belt 14.

To accommodate the guide blocks 24, each of the wheels 10, 12, 16 includes an inner wheel portion 28 and an outer wheel portion 30 spaced from each other on an axle 32 at a distance at least the width of the guide blocks 24. The inner wheel portion 28 and the outer wheel portion 30 also help keep the drive belt 14 in alignment with driving sprocket wheel 10.

A plurality of guide rollers 60 guide and support the belt 58 between the drive and idler wheels 50,54 as shown in FIG. 7. The tensioning means 62 tensions the elastomeric drive belt 58 between the drive wheel 50 and the idler wheel 54.

As in the positive drive system, the guide blocks 64 in the friction drive system undergo wear and tear, requiring the replacement of the entire belt 58 even if only a few of the guide blocks 64 on the belt 58 are damaged. Thus, as in the positive drive system, it is desirable to provide means for protecting components subject to heavy wear and tear, thereby increasing the life of the belt 58.

Another type of such machine which may utilize the protective cover is a friction drive system as is shown in FIG. 7. A belted work machine 46 includes a drive wheel 50, an idler wheel 54, and endless belt which extends around the drive wheel 50 and idler wheel 54. The plurality of the guide blocks 64 are spaced to each other by a predetermined distance. The guide blocks 64 are received by guide channels 66.

During operation, continuous frictional contact between the guide blocks, the driving members, and the idler wheel can cause damage to the guide blocks. Further, when the machine maneuvers over sloped surfaces, the forces on the guide blocks increase due to the fact that the guide blocks support the forces required to drive the machine over the terrain, along with force components of the machine's weight. The increased forces cause greater wear and tear on the guide blocks, requiring replacement of the entire drive belt even if only a few of the guide blocks on the drive belt are damaged. It is desirable to provide means for protecting components subject to heavy wear and tear, thereby increasing the effective life of the drive belt.

Referring to FIG. 8, the configuration of the preferred drive wheel structure 68 and the endless belt 58 are shown. The guide block 64 is received by the guide channel 66.

Currently, there are devices requiring additional structure on the track assembly to improve the alignment of the guide blocks with the idler wheels. Purcell et al. U.S. Pat. No. 5,433,515 discloses guide rollers for a flexible drive belt including first and second rotatable guide rollers adapted to contact guide blocks on the drive belt and guide them into the space between the inner and outer wheel portions of the idler wheel 10. The Purcell et al. device prolongs the useful life of the flexible guide blocks by guiding them into the opening between spaced idler wheels, thereby lessening frictional contact and damage between the idler wheel and the guide blocks. The Purcell et al. device does not, however, disclose means for a covering the guide block to help protect it from wear.

Accordingly, the present invention is directed to overcoming one or more of the problems as set forth above.

DISCLOSURE OF THE INVENTION

In one embodiment of the present invention, a protective cover member for a guide block on a drive belt includes an inner portion shaped to substantially conform to at least a portion of the outer surface of the guide block. The cover member is attached to the guide block using suitable attachment means such as bonding the cover member to the guide block, mechanical fasteners such as screws or bolts, and/or using an interference design whereby the cover member is retained by frictional forces or by snapping around a portion of the guide block. The outer surface of the cover member is shaped and sized to be engaged by drive members associated with a sprocket drive wheel. The cover member may be constructed of material that is capable of withstanding higher temperatures and forces compared to the material of the guide blocks.

BRIEF DESCRIPTION OF DRAWINGS

FIG. 8 is a cross-sectional view of the configuration of the preferred drive wheel structure and the belt.

BEST MODE FOR CARRYING OUT THE INVENTION

Figure 1A:
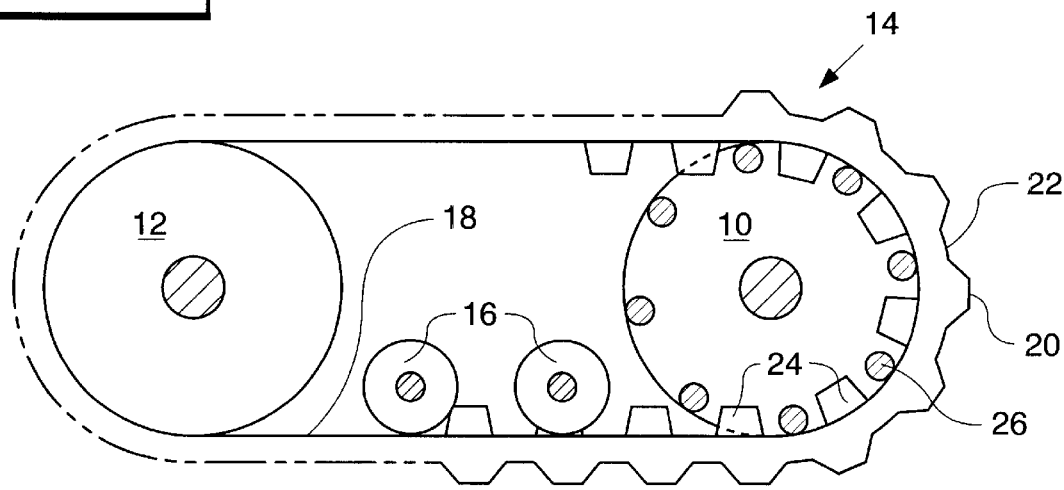
FIG. 1*a* is a front view of a driving sprocket wheel.
Figure 1B:
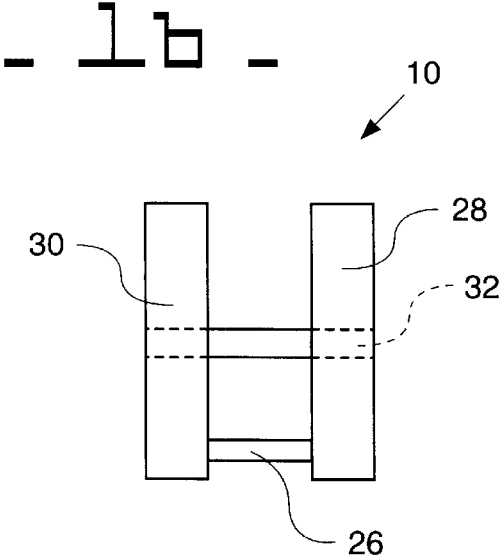
FIG. 1 is a side view of a track assembly with a positive drive system.
Figure 2:
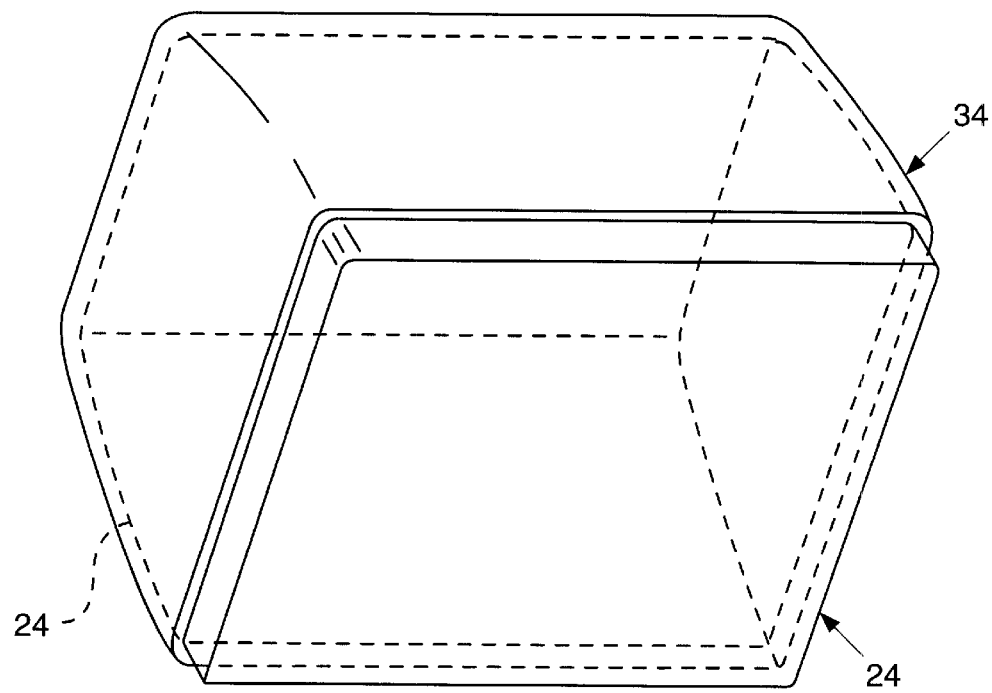
FIG. 2 is a perspective view of the cover member positioned over the guide block.
Figure 3:
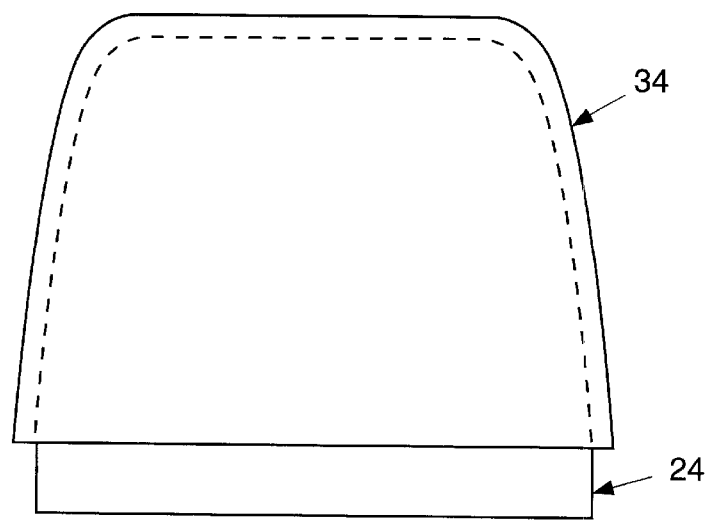
FIG. 3 is a side view of the cover member positioned over the guide block.
Figure 4:
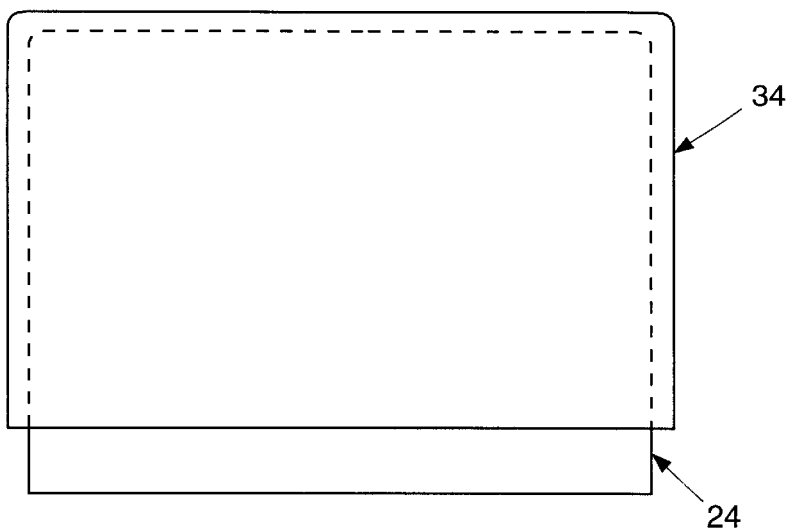
FIG. 4 is a front view of the cover member positioned over the guide block.

Referring to FIGS. 1 and 2, a cover member 34 for covering one or more guide blocks 24 that extend from the surface of the drive belt 14 is shown. The cover member 34 includes an inner portion that is shaped to be positionable over at least a portion of the outer surface of a guide block 24. The guide blocks 24 may have substantially the same or substantially different shapes, and cover member 34 can be constructed to a size and shape that covers the desired portion of a particular guide block 24. The cover member 34 may cover a relatively small portion of the outer surface of the guide block 24, or it may cover a substantial portion of the outer surface of the guide block 24. For example, the cover member 34 may be used on the portion of guide block 24 that comes into contact with drive members 26 during forward and reverse operation. The portion to be covered may therefore include the sides of the guide block 24 that face drive members 26. Alternatively, the cover member 34 may be constructed to fit substantially around the entire guide block 24 as shown in FIGS. 2 through 4.

The cover member 34 is shaped and sized to allow the guide block 24 to be engaged by drive members 26. The thickness of the cover member 34 is selected to allow enough space for drive members 24 between guide blocks 24.

Cover member 34 includes an inner portion shaped to substantially conform to at least a portion of the outer surface of the guide block to facilitate attaching cover member 34 to guide block 24. Various means for attaching cover member 34 to guide block 24 may be used. The attachment means may be temporary to allow cover member 34 to be removed from guide block 24 when desired, such as when replacing a worn cover member 34 with a new cover member 34. Alternatively, the attachment means may be permanent, especially when other components of drive belt 14 are constructed of materials that are less durable than the cover member material, and it is foreseen that drive belt 14 will be replaced before cover members 34 wear out. One attachment means includes bonding cover member 34 to guide block 24 using a suitable adhesive or other bonding method. Another attachment means includes any one or a combination of different types of mechanical fasteners such as a screw, bolt, or clip.

Figure 5:
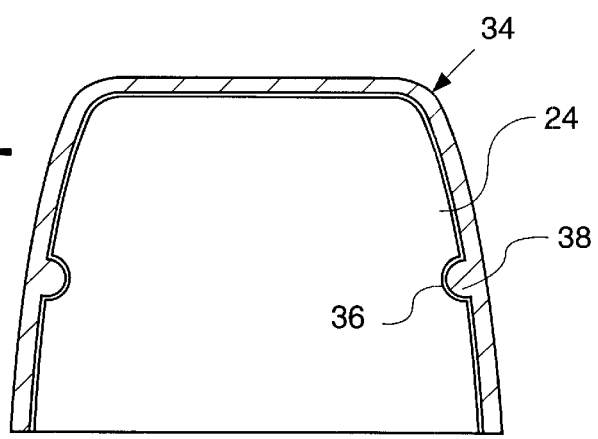
FIG. 5 is a cross-sectional view of the cover member positioned over the guide block showing means for retaining the cover member on the guide block.
Figure 6:
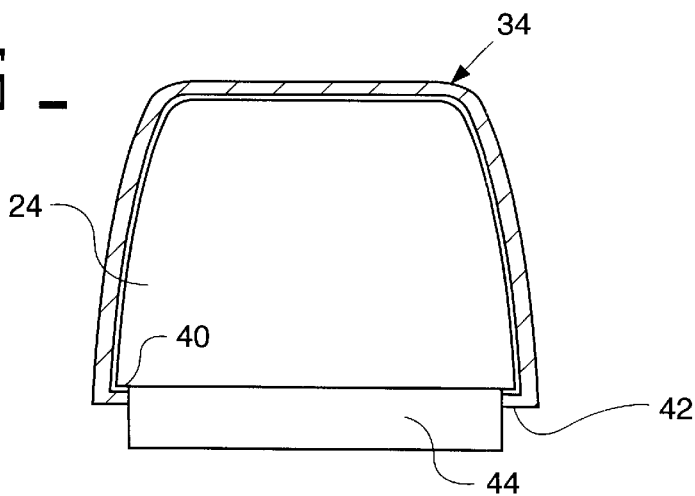
FIG. 6 is a cross-sectional view of the cover member positioned over the guide block showing other means for retaining the cover member on the guide block.
Figure 7:
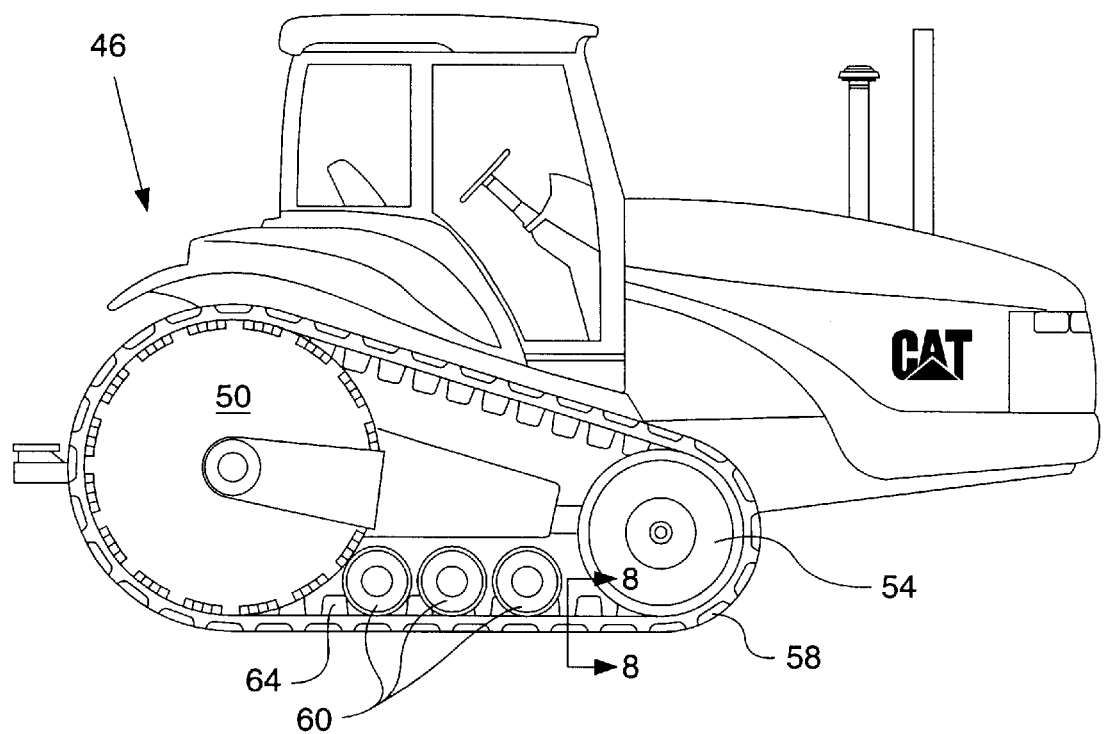
FIG. 7 is a side view of a track assembly with a friction drive system.

The attachment means may further include snapping the cover member 34 around at least a portion of the guide block 24. With this method, a groove 36 may be used to retain a bead portion 38 such as shown in FIG. 5. The groove 36 may be located in either the guide block 24 or the cover member 34, with the bead portion 38 located in the component that does not contain the groove 36. The groove 36 and bead portion 38 may extend around the entire guide block 24 and cover member 34, or around one or more portions of the guide block 24 and cover member 34. Alternatively, the guide block 24 may be constructed to include an edge portion 40 to retain a lip portion 42 on cover member 34 such as shown in FIG. 6. The edge portion 40 and lip portion 42 may extend around the entire perimeter of guide block 24 and cover member 34, or only around selected portions of the perimeters. The edge portion 40 and lip portion 42 may be sized and shaped to allow cover member 34 to be removed as desired.

A further alternative means for attaching cover member 34 to guide block 24 is to construct the inner portion of cover member 34 to fit snugly over the outer surface of guide block 24 so that cover member 34 is retained by frictional force. To increase the frictional forces between the components, the outer surface of guide block 24 and inner surface of cover member 34 may have a textured finish or be lined with materials having the desired coefficient of friction between them.

In the preferred embodiment, cover member 34 is constructed of material that is capable of withstanding higher temperatures and/or forces compared to the material of the guide blocks 24. Representative materials include nylons, polyphthalamides, polyketones, and polyofefins. Reinforcement material may also be added to increase the durability of the cover member 34. The cover member 34 may be manufactured using various processes well known in the art such as rotational molding, injection molding, blow molding, thermoforming, and/or extrusion.

Industrial Applicability

The present invention for a cover member 34 for guide blocks 24 on a drive belt 14 is applicable in situations where machinery having one or more drive belt assemblies, such as the assembly shown in FIG. 1, are used. The cover member 34 provides means to extend the effective life of guide blocks 24, thereby reducing the number of times the entire drive belt 14 must be replaced over the life of a machine. A drive belt 14 may have any number of guide blocks 24, and a corresponding number of cover members 34 may be supplied to protect them. Additionally, there may be some applications where it is desired to cover some of the guide blocks 24 with cover members 34, but not others. Importantly, each individual cover member 34 may be replaced as required when worn. As a further alternative, cover members 34 may be used on the guide blocks 24 until it is determined that remaining useful life of the drive belt 14 is approximately as long as the useful life of the guide blocks 24 without the cover members 34. In this situation, the cover members 34 do not have to be replaced when they are worn. The present invention thus provides economical means for extending the useful life of the drive belt 14 that is adaptable to a variety of situations.

Other aspects, objects and advantages of the present invention can be obtained from a study of the drawings, the disclosure and the appended claims.

What is claimed is:

1. An apparatus for a drive belt, the drive belt including a plurality of guide blocks extending from the surface of the drive belt, the apparatus comprising:

a plurality of cover members, each one of said plurality of cover members being paired with and positioned over an outer surface of one of said plurality of guide blocks said plurality of cover members is attached to the outer surface of said plurality of guide blocks by retaining the cover member with frictional force.

2. An apparatus for a drive belt, the drive belt including a plurality of guide blocks extending from the surface of the drive belt, the apparatus comprising:

a plurality of cover members, each one of said plurality of cover members being paired with and positioned over the outer surface of one of said plurality of guide blocks said plurality of cover members is attached to the outer surface of said plurality of guide blocks by interlocking the cover member with the guide block.

3. A drive belt assembly comprising:

a driving sprocket wheel including a plurality of driving members;

a drive belt extending around the driving sprocket wheel;

a plurality of guide blocks formed on the inner surface of the drive belt for engaging the driving members;

a plurality of cover members, each one of said plurality of cover members being paired with and positionable over an outer surface of one of said plurality of guide blocks said plurality of cover members is attached to the outer surface of said plurality of guide blocks by retaining the cover member with frictional force.

4. A drive belt assembly comprising:

a driving sprocket wheel including a plurality of driving members;

a drive belt extending around the driving sprocket wheel;

a plurality of guide blocks formed on the inner surface of the drive belt for engaging the driving members;

a plurality of cover members, each one of said plurality of cover members being paired with and positionable over an outer surface of one of said plurality of guide blocks each one of said plurality of cover members is attached to the outer surface of said plurality of guide blocks by interlocking the cover member with the guide block.

5. A drive belt assembly comprising:

a drive wheel and an idler wheel;

an endless elastomeric track belt with an inner friction drive surface extending around the drive wheel and idler wheel;

a plurality of guide blocks formed on the inner friction drive surface for guiding the belt; and a plurality of cover members, each one of said plurality of cover members being paired with and positionable over an outer surface of one of said plurality of guide blocks each one of said plurality of cover members is attached to the outer surface of said plurality of guide blocks by retaining the cover member with frictional force.

6. A drive belt assembly comprising:

a drive wheel and an idler wheel;

an endless elastomeric track belt with an inner friction drive surface extending around the drive wheel and idler wheel;

a plurality of guide blocks formed on the inner friction drive surface for guiding the belt; and a plurality of cover members, each one of said plurality of cover members being paired with and replaceably positionable over the an entire outer surface of one of said plurality of guide blocks each one of said plurality of cover members is attached to the outer surface of said plurality of guide blocks by interlocking the cover member with the guide block.

* * * * *